May 18, 1937.  J. F. SOPER  2,081,045
INDEPENDENT FRONT WHEEL SPRINGING SYSTEM FOR MOTOR DRIVEN VEHICLES
Filed Aug. 19, 1935    2 Sheets-Sheet 1

Inventor
James F. Soper
By Raymond A. Robie
Attorney

May 18, 1937. J. F. SOPER 2,081,045
INDEPENDENT FRONT WHEEL SPRINGING SYSTEM FOR MOTOR DRIVEN VEHICLES
Filed Aug. 19, 1935 2 Sheets-Sheet 2
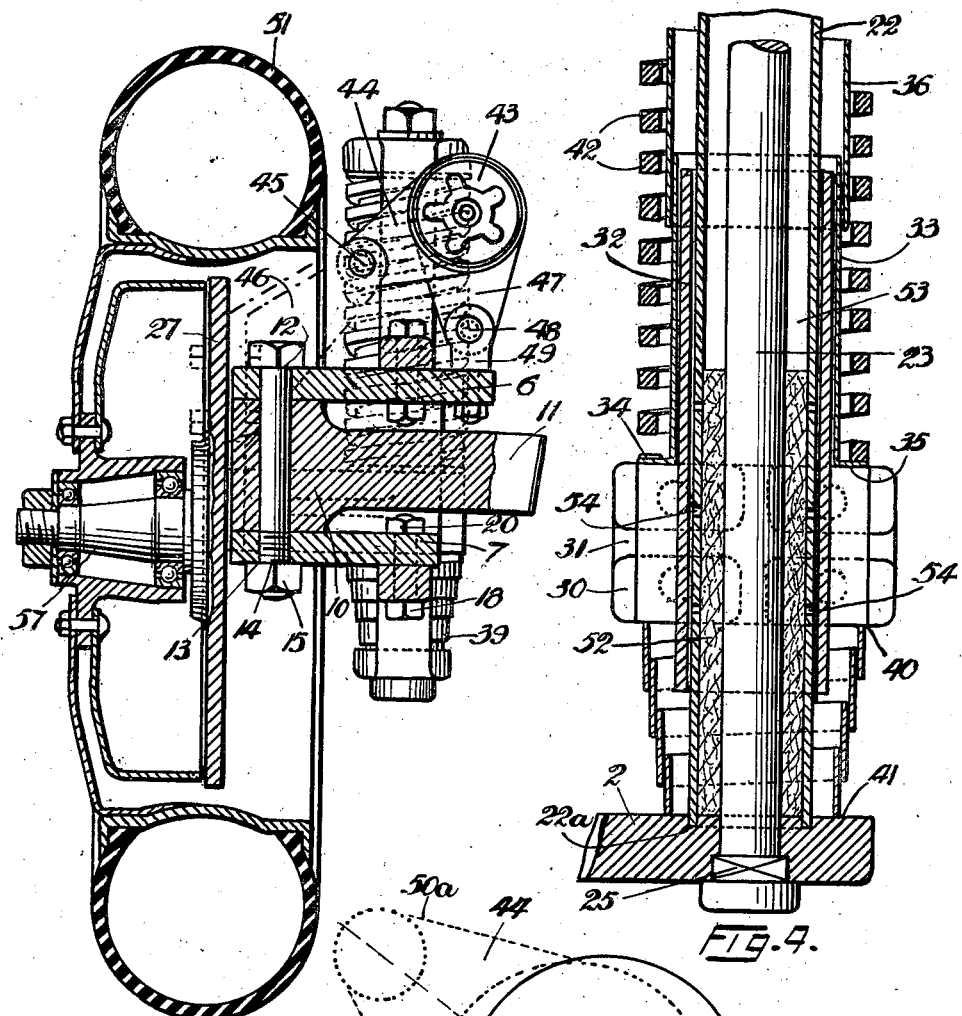
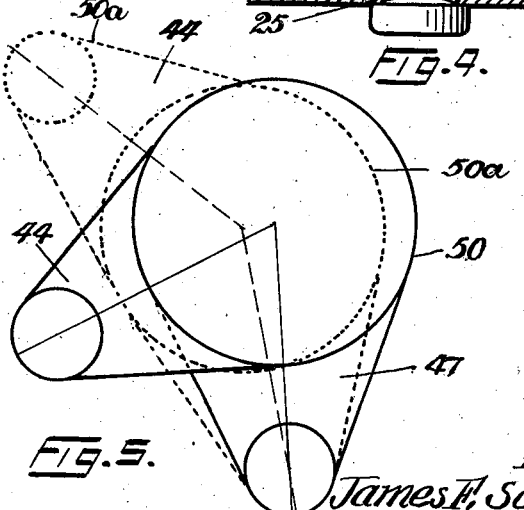
Inventor
James F. Soper
By Raymond A. Robie
Attorney Patented May 18, 1937

2,081,045

UNITED STATES PATENT OFFICE 2,081,045

INDEPENDENT FRONT WHEEL SPRINGING SYSTEM FOR MOTOR DRIVEN VEHICLES

James Frederick Soper, Balclutha, New Zealand

Application August 19, 1935, Serial No. 36,834
In New Zealand April 6, 1935

5 Claims. (Cl. 280—96.2)

This invention relates to springing the wheels of motor cars and motor driven vehicles. An object of the invention is in the provision of an independent system of springing more particularly adapted for the front wheels of motor driven vehicles, by means of which the wheels move vertically upwards or downwards relative to the frame, and with no lateral scraping of the tyres on the road.

Furthermore, in addition to the above features, this upward and downward movement of the wheels, in relation to the frame, has no effect on the steering as the steering gear is arranged to act independent of the springs.

The above and other objects of the invention will be readily apparent from a perusal of the specific description which is to follow, and the claims.

In the accompanying drawings:—

Figure 2 is a cross sectional elevation on the line A—A in Figure 1.

Figure 4 represents an enlarged part longitudinal section on the line C—C in Figure 3 showing a portion of the tubular guide, the bracket and slidable sleeve, a portion of the helical spring and the volute spring.

Figure 5 is a diagrammatic view of a friction type of shock-absorber showing it in the minimum and maximum positions.

Figure 1:
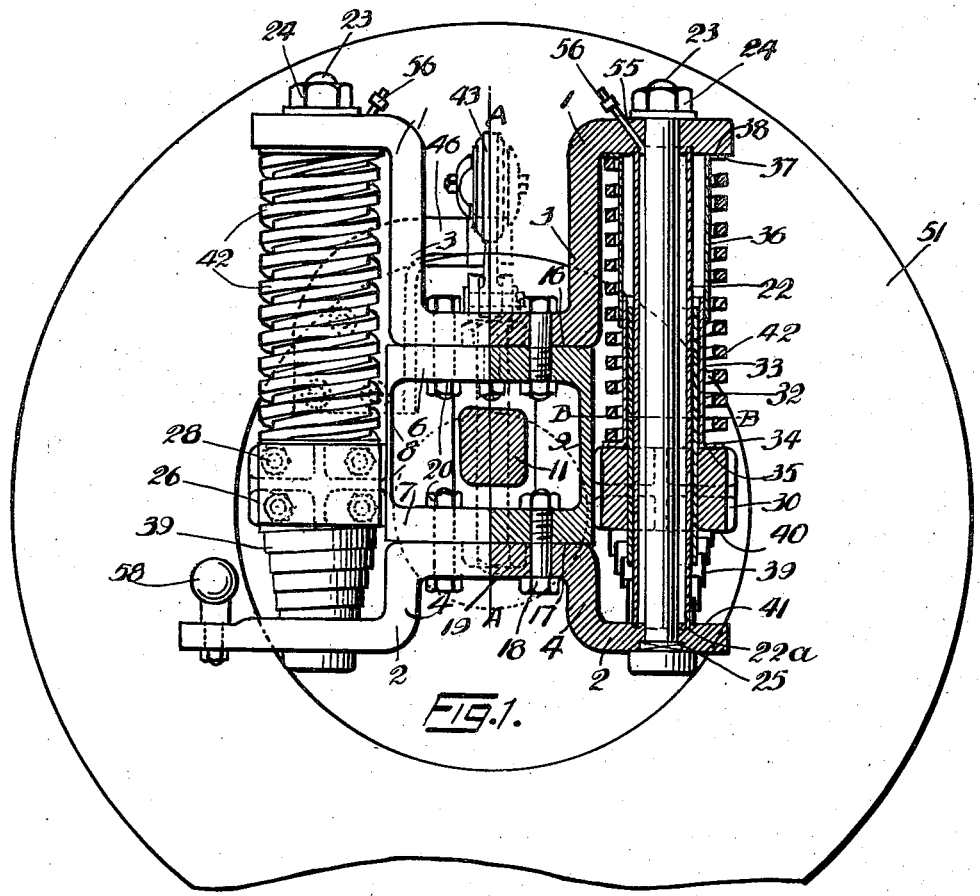
Figure 1 is a half front elevation and a half longitudinal section of my independent springing system as adapted to the front wheels of motor driven vehicles.

Referring to the drawings the bridge members 1 and 2 are formed crank shape as at 3 and 4. A triangular shaped member 5 having the upper and lower plates 6 and 7 joined by the sides 8 and 9 forming a box section without the ends. The end portion 10 of the axle beam 11 is disposed in the member 5, between the upper and lower plates 6 and 7 thereof, and is pivotally mounted to the triangular shaped member at its apex end, by means of a swivel bolt 12. To ensure having a substantially secure job the end portion 13 of the bolt 12 is preferably formed with a longer threaded end portion which engages in a corresponding threaded bore 14 in the lower plate 7 of the triangular shaped member 5, and is then secured by the nut 15.

The flat surfaces 16 and 17 of the cranked parts 3 and 4 of the bridge members contact with the upper and outer surfaces of the plates 6 and 7 of the triangular shaped member 5 and are secured thereto by the bolts or pins 18.

To more securely fasten the bridge members to the upper and lower plates 6 and 7, the ends of the bolt 18 are formed with a longer threaded portion which engage in the corresponding threaded holes 19 in the plates 6 and 7 of the rectangular shaped member, and secured therein by nuts 20.

Figure 3:
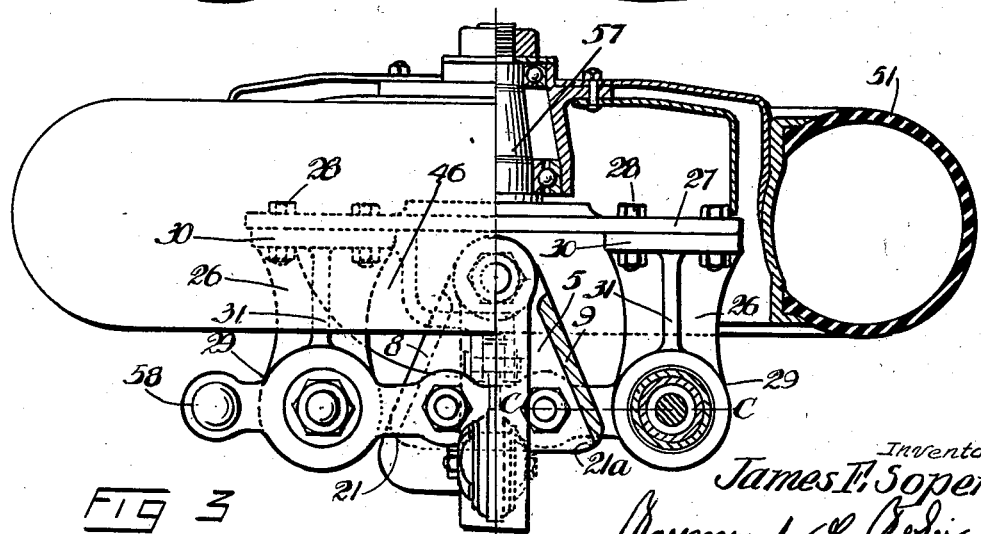
Figure 3 is a half plan and a half cross sectional elevation on the line B—B in Figure 1.

It will be seen in Figure 3 of the drawings that the swivel bolt 12, at the apex of the triangular shaped member 5, is out of centre with the centre line of the bridge members, allowing the steering pivot to be nearer the wheel centre. This allows for an angular movement of the wheel relative to the axle beam 11. The distance between the outer ends 21 and 21a of the sides 8 and 9 of the triangular shaped member 5 allow for steering lock.

A tubular guide 22 is provided between the upper and lower overhanging ends of the crank shaped bridge members 1 and 2, at each side of the triangular shaped member 5. The tubular guides 22, the ends of which are disposed in suitable recesses 22a in the inner surfaces of the extended ends of the bridge members 1 and 2, effectively support the overhanging end parts of the bridge members against bending, and are secured in position by passing a bolt 23 through a bore in each bridge member and a tubular guide, securing thereto by means of a nut 24.

To prevent the bolt 23 from turning when tightening its nut 24 they are preferably formed with a square portion 25 inside the head.

A bracket 26 is provided at each side of the triangular shaped member 5, those brackets are rigidly secured to the brake anchorage plate 27 by means of rivets, pins or bolts 28. The outer portion of the bracket 26 may be cylindrical as at 29 and joined to its flange 30 by webs or ribs 31.

The longitudinal axis of the cylindrical portion 29 of the brackets 26 coincides with the axis of its tubular guide 22.

The cylindrical portion 29 of the bracket 26 is bored to receive a sleeve 32. The sleeve may be secured therein by having the bore slightly smaller in diameter than the sleeve, and forcing the sleeve into the bore of the cylinder, or by shrinking the boss thereon, or by forming the sleeve integral with the cylindrical portion of the bracket 26.

Each sleeve 32 is adapted to engage with and be slidable on its respective tubular guide 22.

To protect the portion of the sleeve 32, above the cylindrical part 29 of the bracket member 26 from grit and dust, it is surrounded by a telescopic shield or cover; the lower part 33 is formed with a flange 34 which rests on the upper surface 35 of the cylindrical part of the bracket member.

The lower part 33 of the shield telescopes into the upper part 36. This part of the shield is also formed with a flange 37 which contacts with the under surface 38 of the bridge member 1.

To protect the portion of the sleeves 32 which extends below the cylindrical part 29 of the bracket member 26 from grit and dust, there is provided a volute spring 39. Each spring is under a compressive stress and is interposed between the lower surface 40 of the cylindrical part 29 of its bracket member and the inner surface 41 of the bridge member 2.

A helical spring 42, shown in the drawings as of square section, but any other suitable section may be used, is interposed between the flanges 34 and 37 of the telescopic shields and surrounds the cylindrical bodies of the said shields.

Referring to Figures 1, 2 and 3 of the drawings in which is shown a friction type of shock-absorber 43, this is only by way of illustration as any double arm shock-absorber, for instance, a hydraulic may be used.

In the type of shock-absorber shown, the free end of the arm 44 is pivotally mounted on a pin 45 in the bracket 46; the bracket 46 is secured to the brake anchorage plate 27. The free end of the other arm 47 of the shock-absorber is pivotally mounted on a pin 48 in the bracket 49; the bracket 49 being secured to an extension of the upper plate 6 of the triangular shaped member 5.

In Figure 5 of the drawings is a diagrammatic view of the friction type of shock-absorber; it will be seen that its normal position is as shown by the full lines 50, but, on the wheel 51 of the vehicle encountering an obstacle, the helical springs 42 are compressed, and the volute springs 39 extend as they are normally under a compressive stress. But, owing to the upward movement of the wheel 51 with the brake anchorage plate 27 and bracket 46, this movement is effected against the increasing resistance of the shock-absorber. When this occurs, the alteration in the position of the arm 44, and the centre of the body, would approximately be as shown by the dotted lines 50a, by this means producing a diminishing leverage on the shock-absorber.

The manner in which the lubrication of the sleeves 32 may be carried out, is in disposing cotton wick 52, or other suitable absorbent, in the annular space 53, between the circumference of the bolt 23, and the inner wall of the tubular guide 22; the bottom end parts of the cotton wick 52 contacting with oil in the annular space 53, the oil being drawn up the wick by capillary attraction and on passing through holes 54 in the tubular guide 22, provides a film of oil between the bearing surface of the tubular guide 22 and the sleeve 32.

A bore 55 is provided at each side of the upper bridge member 1, communicating with an annular space 53, by means of which oil may be supplied therein to maintain the cotton wick in a moist condition. A threaded plug 56 engages in the threaded bore 55 so as to prevent dust from passing into the annular space 53.

It will be understood, that although the description of the mechanism in the specification applies to one side, a similar set is provided on the other side of the centre line of the triangular shaped member, and a dual set is provided for the opposite wheel.

It will also be apparent, that as the triangular shaped member 5 is pivotally mounted on the bolt 12, and to the end 10 of the axle beam 11, a sufficient clearance is provided at the wide end of the triangular shaped member, between the sides 8 and 9 thereof and the sides of the axle beam 11, to allow for steering lock when the triangular shaped member, carrying the whole of the spring system for one wheel, is displaced through a horizontal arc under control of a steering arm 58.

This independent front wheel springing system is compact, has few wearing parts, and may be readily assembled, of which the following is a description:—

The lower cranked bridge member 2 is secured to the outer surface of the plate 7 of the triangular shaped member 5 by means of the bolts 18. A tubular guide 22 is placed in each recess 22a, a volute spring 39 being passed on to each tubular guide. The sleeve 32 on the bracket 26 is passed on to a tubular guide, each sleeve engaging with and slidable on its respective tubular guide 22, the lower end of the cylindrical portion of each bracket 26 contacts with the upper edge of a volute spring 39, a telescopic shield 33 is passed on to each sleeve 32 and a helical spring 42 is disposed over the shield, its lower end resting on the flange 34 of its telescopic shield 33. The upper portion 36 of each telescopic shield is disposed inside the helical spring 42 the flange 37 thereof resting on the surface of the end of the helical spring.

The cranked bridge member 1 is placed on top of the upper telescopic shield flanges 37, above the helical springs 42, and drawn against the resistance of the springs down into position by long threaded temporary bolts in the threaded holes 19. The long bolts 23 are then placed in position and the nuts 24 secured thereon. The temporary bolts are now withdrawn and the short bolts 18 substituted.

The method of operation is as follows:—As the wheels 51, being mounted on their respective axles 57, rise over obstructions, the sleeves 32 slide upwards on their guides 22 against the rapidly increasing resistance to movement of the upper shock-absorber arms 44, and compressing the helical load springs 42. Furthermore, as the helical springs 42 are compressed, the volute recoil springs 39 extend, relieving part of the pressure on the load springs.

As the wheels return to normal position and the helical springs 42 extend, the retarding effect of the shock-absorber decreases as the upper arms 44 of the shock-absorber are drawn downwards. Any recoil movement of the load springs, past the normal load position, is progressively opposed by the volute springs.

Due to the construction of my independent springing system, the outer end of the upper arm of the shock-absorber 43 is constrained to move in one plane. Therefore, as there is no side thrust or torque on the arms, the arms may be made short by which means a greater variation in leverage through the arms on the shock-absorber may be obtained.

My invention may likewise be adapted for the rear wheels with slight modifications.

The construction of my independent front wheel springing system lends itself to a single attachment without extra wearing parts, of lamps which turn horizontally under control of the steering gear, by means of brackets secured to the upper bridge member 1, the centre of the lamp attachment to the brackets is passed into an opening in the mud guard directly above and in alignment with the steering pivot 12.

Having thus fully described my invention, what I claim as new and desire to secure by Letters Patent is:—

1. An independent front wheel springing system for motor driven vehicles, comprising upper and lower cranked bridge members, a triangular shaped member interposed between and secured to the central parallel parts of the cranked bridge members, a tubular guide at each side of the triangular shaped member disposed between and secured to the overhanging ends of the cranked bridge members, a pair of brackets each having a cylindrical portion and a sleeve thereon engaging with a tubular guide, the said brackets being secured to the brake anchorage means, a helical spring on each of the said sleeves between the upper surface of the cylindrical portion of the bracket and the lower surface of the upper cranked bridge member, a volute compression spring interposed between the lower surface of the cylindrical portion of the brackets and the inner surface of the lower cranked bridge member, means for protecting the sleeves from grit and dust, and means for lubricating the said sleeves.

2. In an independent front wheel springing system according to claim 1, a pair of parallel members constituting the upper and lower plates of the triangular shaped member between which the end portion of the axle beam engages and is pivoted to the said triangular shaped member at the apex end thereof, side plates joining the upper and lower parallel plates of the said triangular shaped member, each side plate extending from the inner or wide end to near the outer or apex end, by which means the distance between each side of the axle beam and the ends of the side plates allows for horizontal angular displacement of the said triangular shaped member.

3. In an independent front wheel springing system according to claim 1, a telescopic shield surrounding each sleeve and over which a helical spring is passed, the upper end of the said helical spring contacting with the flange of the upper portion of a telescopic shield, the lower end contacting with the flange of the lower portion of a telescopic shield, and a volute spring, normally under a compressive stress, on the lower part of each sleeve between the lower surface of the cylindrical portion of a bracket member and the inner surface of the overhanging part of the lower cranked bridge member, whereby each sleeve is protected from grit and dust.

4. In combination with an independent front wheel springing system according to claim 1, a shock-absorber mounted between the vertical sides of the upper cranked bridge member, said shock-absorber having one arm pivoted on a bracket secured to the top of the triangular shaped member and the other arm pivoted on a bracket secured to the brake anchorage means, whereby energy stored in the helical springs, when compressed, is absorbed during the recoil in overcoming the frictional resistance of the said shock-absorber and bringing it back to its normal position.

5. In an independent front wheel springing system according to claim 1, wherein the triangular shaped member is pivotally mounted to the axle beam inside the plane of a wheel secured rotatably to the brake plate, whereby said wheel is permitted to be angularly displaced through a horizontal arc and allow for steering lock.

JAMES FREDERICK SOPER.